(12) United States Patent
Slavíček et al.

(10) Patent No.: US 9,207,966 B2
(45) Date of Patent: Dec. 8, 2015

(54) METHOD AND SYSTEM FOR PROVIDING A HIGH-AVAILABILITY APPLICATION

(71) Applicant: Red Hat, Inc., Raleigh, NC (US)

(72) Inventors: Pavel Slavíček, Brno (CZ); Rostislav Svoboda, Šlapanice (CZ)

(73) Assignee: Red Hat, Inc., Raleigh, NC (US)

( * ) Notice: Subject to any disclaimer, the term of this patent is extended or adjusted under 35 U.S.C. 154(b) by 167 days.

(21) Appl. No.: 14/135,104

(22) Filed: Dec. 19, 2013

(65) Prior Publication Data

US 2015/0178122 A1    Jun. 25, 2015

(51) Int. Cl.
*G06F 9/455* (2006.01)
*G06F 9/46* (2006.01)
*G06F 17/30* (2006.01)

(52) U.S. Cl.
CPC .......... *G06F 9/466* (2013.01); *G06F 17/30289* (2013.01)

(58) Field of Classification Search
CPC ..................................................... G06F 9/466
USPC ................................................. 718/101–108
See application file for complete search history.

(56) References Cited

U.S. PATENT DOCUMENTS

| | | | |
|---|---|---|---|
| 7,295,952 B1* | 11/2007 | Cheng et al. | 702/185 |
| 8,266,472 B2 | 9/2012 | Bose | |
| 2004/0010539 A1* | 1/2004 | Archbold | 709/201 |
| 2004/0153558 A1 | 8/2004 | Gunduc et al. | |
| 2007/0006212 A1* | 1/2007 | Kawamoto | 717/170 |
| 2010/0228747 A1* | 9/2010 | Taylor et al. | 707/752 |
| 2011/0041006 A1* | 2/2011 | Fowler | 714/10 |
| 2012/0047107 A1 | 2/2012 | Doddavula et al. | |
| 2013/0066949 A1* | 3/2013 | Colrain et al. | 709/203 |
| 2015/0082316 A1* | 3/2015 | Zaldivar et al. | 718/103 |

OTHER PUBLICATIONS

Kim, Won. "Highly available systems for database applications." ACM Computing Surveys (CSUR) 16.1 (1984), pp. 71-98.*
Bamford, Roger, Rafiul Ahad, and Angelo Pruscino. "A scalable and highly available networked database architecture." VLDB. vol. 99. 1999, pp. 199-201.*
Baker, Jason, et al. "Megastore: Providing Scalable, Highly Available Storage for Interactive Services." CIDR. vol. 11. 2011, pp. 223-234.*

(Continued)

*Primary Examiner* — Satish Rampuria
(74) *Attorney, Agent, or Firm* — Haynes and Boone, LLP (57) ABSTRACT

A system, method, and techniques for providing high availability to an application are provided. An example system includes a plurality of databases and a persistence layer that generates, based on a request, one or more sets of database commands that is specific to a database. The system also includes a high-availability layer that is an intermediary between the persistence layer and the plurality of databases, and includes a transaction manager and an execution engine. The transaction manager starts a composite transaction including a sub-transaction corresponding to each database of the plurality of databases and determines whether each applied sub-transaction has successfully completed. A sub-transaction includes a set of database commands. The execution engine applies each sub-transaction to its corresponding database.

19 Claims, 5 Drawing Sheets

(56) References Cited

OTHER PUBLICATIONS

Rabi Prasad Padhy et al. "Architecture & Design of Affordable and Highly Available Enterprise Cloud Service" Intl. Journal of Cloud Computing and Services Science (IJ-CLOSER); Apr. 2013, pp. 85-105; vol. 2, No. 2,, Institute of Advanced Engineering and Science ; http://www.iaesjournal.com/online/index.php/IJ-CLOSER/article/download/1527/pdf (retreived Dec. 20, 2013).

Oracle Berkeley DB Java Edition; Oracle Berkeley DB, 2 pages; http.//www.oracle.com/technetwork/database/berkeleydb/overview/index-093405.html (retrieved Dec. 20, 2013).

JBoss Enterprise Application Platform 6.1 Development Guide; Development Guide—Red Hat Customer Portal; pp. 1-377, 2013 Red Hat, Inc.; https://access.redhat.com/site/documentation/en-US/JBoss_Enterprise Application_Platform/6.1/html-single/Development_Guide/index.html#About_Hibernate_Core retrieved Dec. 20, 2013.

* cited by examiner

METHOD AND SYSTEM FOR PROVIDING A HIGH-AVAILABILITY APPLICATION

FIELD OF DISCLOSURE

The present disclosure generally relates to a high-availability application, and more particularly to data storage associated with the high-availability application.

BACKGROUND

High availability (HA) is one of the basic requirements for nowadays enterprise applications. Enterprise systems operating today are subject to continuous program execution, that is 24 hours a day and 7 days a week. There is no longer the concept of "overnight" or "planned downtime." All programs and data must be available at any point during the day and night. Any outages or deteriorated service can result in loss of revenue as customers simply take their business elsewhere, and the enterprise stops to function on a global scale.

Databases vendors may use several different strategies to implement high availability for a data storage system. The implementation of high availability for a data storage is a complex technical problem and uses strategies that typically require special and expensive hardware or a special configuration of databases that brings limitations for the provided features. High availability may be provided to an application when it is able to survive, for example, a crash on the database server that stores data for the application.

A traditional approach of providing high availability to an application uses a storage area network (SAN). A SAN is a high performance dedicated network used primarily to provide fast and reliable communication between computers and storage devices in a shared storage networking environment. The SAN also enables a storage device to communicate with another storage device. Software solutions at the database level, however, are complex and expensive. For example, a database within a cluster may be a "share everything" database in which all data files, control files, and redo log files used by the database reside on a shared storage that is accessible by all other database instances. This traditional approach is typically expensive and proprietary.

BRIEF SUMMARY

Methods, systems, and techniques for providing high availability to an application are disclosed.

According to an embodiment, a system for providing high availability to an application includes a plurality of databases. Databases in the plurality of databases are isolated instantiations relative to each other. The system also includes a persistence layer that receives a request including a transient entity to persist. The persistence layer generates, based on the request, one or more sets of database commands that is specific to a database of the plurality of databases and that manipulates the database. The system further includes a plurality of application servers that deploy a high-availability application. The high-availability application creates the transient entity and sends the request to the persistence layer. The system also includes a high-availability layer that is an intermediary between the persistence layer and the plurality of databases. The high-availability layer includes a transaction manager and an execution engine. The transaction manager starts a composite transaction including a sub-transaction corresponding to each database of the plurality of databases and determines whether each applied sub-transaction has successfully completed. When each sub-transaction is determined to have successfully completed, the transaction manager sends to the persistence layer a message indicating successful completion of the composite transaction. A sub-transaction includes a set of database commands. The execution engine applies each sub-transaction to its corresponding database. When a particular database successfully completes a sub-transaction, the particular database sends a confirmation of successful completion of the sub-transaction.

According to another embodiment, a method of providing high availability to an application includes receiving a request including a transient entity to persist. The method also includes generating, based on the request, one or more sets of database commands that is specific to a database of a plurality of databases and that manipulates the database. The databases in the plurality of databases are isolated instantiations relative to each other. The method further includes starting a composite transaction including a sub-transaction corresponding to each database of the plurality of databases. A sub-transaction includes a set of database commands. The method also includes applying each sub-transaction to its corresponding database. When a particular database successfully completes a sub-transaction, the particular database sends a confirmation of successful completion of the sub-transaction. The method further includes determining whether each applied sub-transaction has successfully completed. When each sub-transaction is determined to have successfully completed, the transient object is persisted in the plurality of databases.

According to another embodiment, a non-transitory machine-readable medium includes a plurality of machine-readable instructions that when executed by one or more processors is adapted to cause the one or more processors to perform a method including: receiving a request including a transient entity to persist; generating, based on the request, one or more sets of database commands that is specific to a database of a plurality of databases and that manipulates the database, the databases in the plurality of databases being isolated instantiations relative to each other; starting a composite transaction including a sub-transaction corresponding to each database of the plurality of databases, the respective sub-transaction including a set of database commands; applying each sub-transaction to its corresponding database; and determining whether each applied sub-transaction has successfully completed. When each sub-transaction is determined to have successfully completed, the transient object is persisted in the plurality of databases.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
   A. Persist Transient Entity
   B. Intermediary Between Persistence Layer and Data Storage Devices
   C. Composite Transaction Including Sub-Transaction
   D. Inform Persistence Layer of Status of Composite Transaction
III. Java Persistence API
IV. Example Method
V. Example Computing System I. Overview It is to be understood that the following disclosure provides many different embodiments, or examples, for implementing different features of the present disclosure. Some embodiments may be practiced without some or all of these specific details. Specific examples of modules and arrangements are described below to simplify the present disclosure. These are, of course, merely examples and are not intended to be limiting.

The disclosure provides a software-level mechanism that provides high availability for a persistence layer (e.g., Java® Persistence Application Programming Interface (JPA) implementation) coupled to non-high availability database storage.

In an embodiment, a system for providing high availability to an application includes a plurality of databases. Databases in the plurality of databases are isolated instantiations relative to each other. The system also includes a persistence layer that receives a request including a transient entity to persist. The persistence layer generates, based on the request, one or more sets of database commands that is specific to a database of the plurality of databases and that manipulates the database. The system further includes a plurality of application servers that deploy a high-availability application. The high-availability application creates the transient entity and sends the request to the persistence layer. The system also includes a high-availability layer that is an intermediary between the persistence layer and the plurality of databases. The high-availability layer includes a transaction manager and an execution engine. The transaction manager starts a composite transaction including a sub-transaction corresponding to each database of the plurality of databases and determines whether each applied sub-transaction has successfully completed. When each sub-transaction is determined to have successfully completed, the transaction manager sends to the persistence layer a message indicating successful completion of the composite transaction. A sub-transaction includes a set of database commands. The execution engine applies each sub-transaction to its corresponding database. When a particular database successfully completes a sub-transaction, the particular database sends a confirmation of successful completion of the sub-transaction.

II. Example System Architecture

Figure 1:
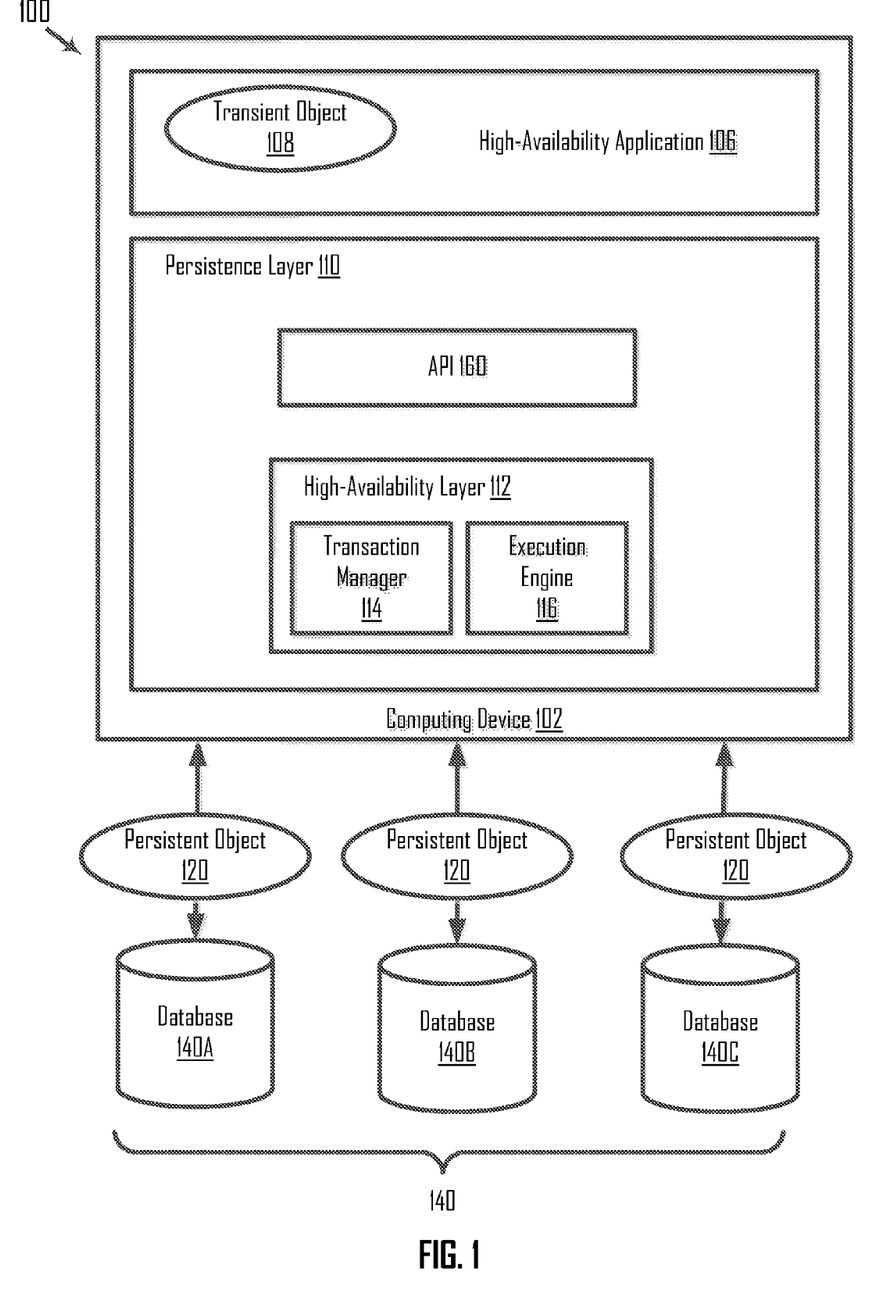
FIG. 1 is a block diagram illustrating a system for providing high availability to an application, according to an embodiment.

FIG. 1 is a block diagram illustrating a system 100 for providing high availability to an application, according to an embodiment. System 100 includes a computing device 102 coupled to a plurality of databases 140, which includes databases 140A, 140B, and 140C. In an example, computing device 102 is a server (e.g., application server). In such an example, an application may be a high-availability application that is deployed on a plurality of application servers. The plurality of application servers may deploy the same application such that if an application executing on a first application server of the plurality of application servers goes down, the same application may still be accessible via a second application server of the plurality the application servers. In an example, the application is an enterprise application.

Computing device 102 may execute a high availability (HA) application 106 that is written in a high-level programming language. In an example, HA application 106 is written in an object-oriented programming language that defines classes. A data object may be a self-contained entity that has state and behavior and represents an instance of a class. The data object's state may be described as its fields and properties, and the data object's behavior may be described by its methods. HA application 106 may include code that creates objects of a class, and an object of a particular class may expose methods and properties defined by that class. HA application 106 executing on computing device 102 may instantiate a data object.

A. Persist Transient Entity

An entity is a data object that lives in memory and persistently in a database. An entity has the ability to be mapped to a database and may be concrete or abstract, and may support inheritance and relationships. In an example, a data object instantiated by HA application 106 is a transient entity 108 that may be persisted in plurality of databases 140. Each database of plurality of databases 140 may be considered an active database in which to persist data. Transient entity 108 is accessible by HA application 106, which may read or modify transient entity 108. The state of transient entity 108 may include one or more behaviors and one or more methods and is not stored in a database. HA application 106 may desire to save the state of transient entity 108 such that it is persistent and is retrievable at a later point in time.

Computing device 102 includes a persistence layer 110 and a high-availability layer 112 that work together to provide high-availability to HA application 106 and to persist transient entity 108 in plurality of databases 140. HA application 106 may use persistence layer 110 as a persistent storage service. In an example, to save the state of transient entity 108, HA application 106 may send to persistence layer 110 a request to persist the state of transient entity 108. The request includes the state of transient entity 108.

Persistence layer 110 receives from HA application 106 the request to persist transient entity 108. The request may cause a new persistent entity to be stored in each database of plurality of databases 140 and/or may cause an existing entity in each database of plurality of databases 140 to be modified or deleted. Each database of plurality of databases 140 may be considered an active database in which to persist data. A database that is not in plurality of databases 140 may be considered to be an inactive database. An inactive database is not used to persist data because, for example, it is considered unsafe to store data in.

B. Intermediary Between Persistence Layer and Data Storage Devices

Persistence layer 110 and high-availability layer 112 may cooperate to persist transient entity 108 in plurality of databases 140. Persistence layer 110 may pass the request onto high-availability layer 112 for processing and to coordinate the storage of transient entity 108 in plurality of databases 140. High-availability layer 112 may be an intermediary between persistence layer 110 and plurality of databases 140. In an example, HA application 106 desires to write data through persistence layer 110, which is above high-availability layer 112. In an embodiment, high-availability layer 112 is implemented at the software level, which is above the database level. High-availability layer 112 may behave as one data source from the perspective of persistence layer 110. For example, persistence layer 110 may communicate with high-availability layer 112, which then communicates with plurality of databases 140. High-availability layer 112 ensures that the same data are persisted to plurality of databases 140 and are consistent. Databases of plurality of databases 140 may be on separate physical servers.

High-availability layer 112 may write data in parallel to plurality of databases 140 and synchronize the writing of data to multiple databases within a single composite transaction. High-availability layer 112 may control the transactions of multiple databases. Writing data in parallel to plurality of databases 140 may be transparent to HA application 106. After data is written to plurality of databases 140, the data across the databases coupled to HA application 106 are consistent. Data are consistent in all configured databases because the modifications are executed on all databases and coordinated within the composite transaction. The data are stored in multiple places and accessible via multiple databases at a time. This may be in contrast to other high availability solutions that have data stored in one place and multiple instances of a database that are reading the same data stored in the same database. High-availability layer 112 may provide functionality that enables data to be written in parallel to databases and provide high availability to application 106 while providing high availability for an application at a lower price and with less complexity.

In an example, persistence layer 110 generates, based on the request, one or more sets of database commands that is specific to a database of plurality of databases 140. The set of commands manipulates the database by inserting and/or modifying an entity in each database of plurality of databases 140. Databases in plurality of databases 140 may be relational databases. Accordingly, when transient entity 108 is stored in plurality of databases 140, persistence layer 110 bridges the gap between the object model presentation of transient entity 108 and the relational model of the databases. As such, persistence layer 110 may perform an object-to-relational mapping (ORM) by mapping the state of transient entity 108 to each relational database made of tables containing rows and columns.

High-availability layer 112 may use this functionality of persistence layer 110 to obtain one or more sets of database commands that is specific to each of the databases of the plurality of databases and manage the one or more sets of database commands. The set of database commands can be a set of Standard Query Language (SQL) commands. In an example, high-availability layer 112 wraps up the one or more generated sets of commands, transforms them into concrete SQL commands for concrete databases, and coordinates execution of them on multiple data sources in parallel. In an example, high-availability layer 112 sends a request to persistence layer 110 to generate the one or more sets of database commands. In such an example, HA application 106 may invoke an API 160 of persistence layer 110. In another example, responsive to receiving from the application the request to persist an entity, persistence layer 110 generates the one or more sets of database commands and passes the one or more generated sets of database commands to high-availability layer 112.

C. Composite Transaction Including Sub-Transactions

Figure 2:
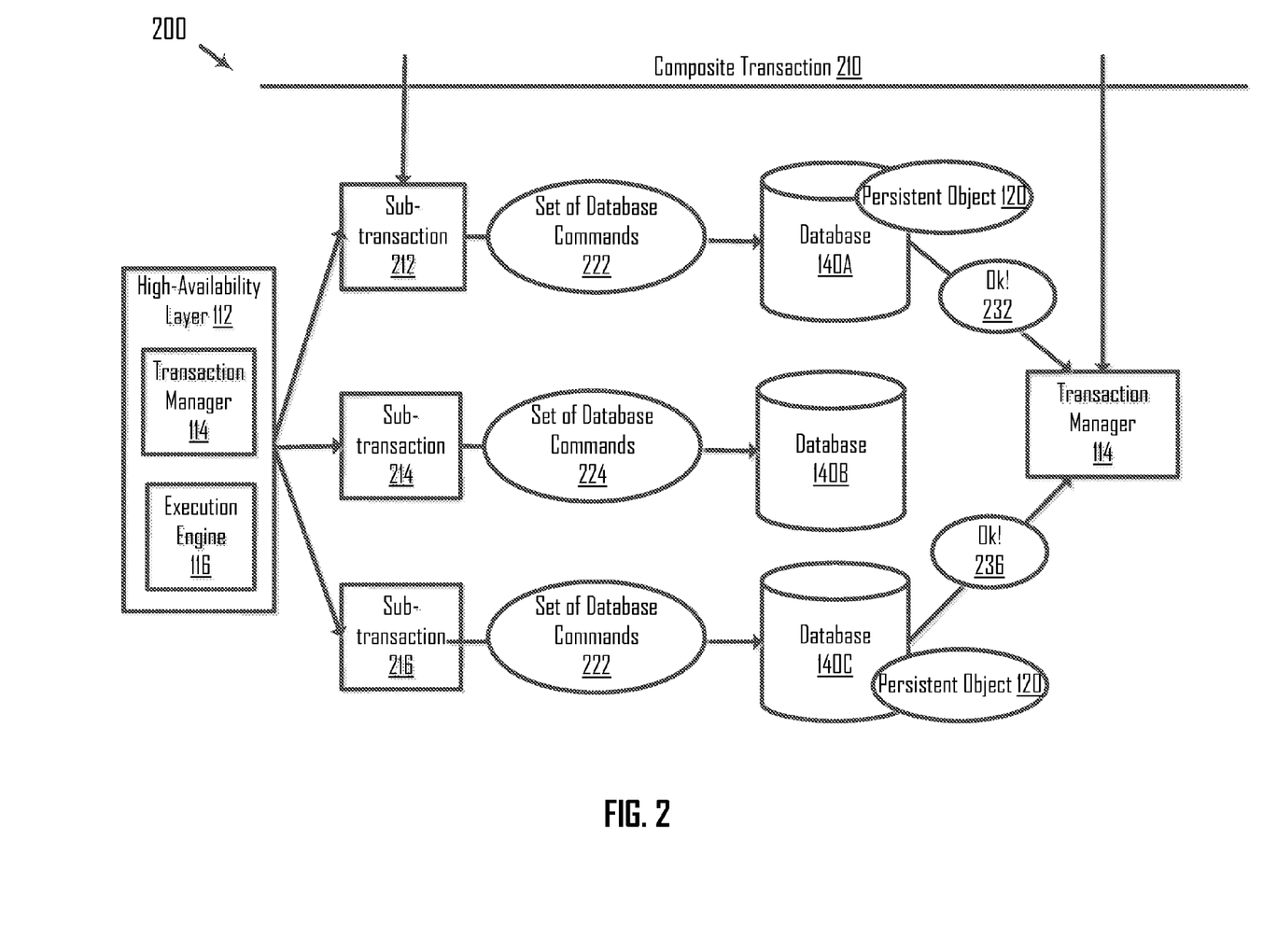
FIG. 2 is a process flow diagram illustrating the processing of a composite transaction, according to an embodiment.

High-availability layer 112 includes a transaction manager 114 and an execution engine 116. In an embodiment, transaction manager 114 starts a composite transaction including a sub-transaction corresponding to each database of plurality of databases 140. A sub-transaction includes a set of database commands that is specific to a database of plurality of databases 140. FIG. 2 is a process flow diagram 200 illustrating the processing of a composite transaction 210, according to an embodiment. Composite transaction 210 includes a sub-transaction 212 that corresponds to database 140A, a sub-transaction 214 that corresponds to database 140B, and a sub-transaction 216 that corresponds to database 140C. Each database of plurality of databases 140 represents a resource in composite transaction 210 and transaction manager 114 coordinates composite transaction 210. Within each sub-transaction, a set of commands within that sub-transaction is executed against its corresponding database. The result of composite transaction 210 is eventually communicated to persistence layer 110.

The one or more generated sets are concurrently executed on separate database systems. In an example, plurality of databases 140 includes homogenous clusters of database servers. For example, in FIG. 2, persistence layer 110 generates a set of database commands 222 that is specific to database 140A and is specific to database 140C. As such, the same set of database commands is generated for each of these databases. In another example, plurality of databases 140 includes hybrid clusters of database servers. Each of the hybrid clusters of database servers may have a different set of database commands, depending on the database vendor. For example, in FIG. 2, persistence layer 110 generates at least two different sets of commands that are specific to databases of plurality of databases 140. In particular, persistence layer 110 generates set of database commands 222 that is specific to databases 140A and 140C and also generates a set of database commands 224 that is specific to database 140B. Set of database commands 222 is different from set of database commands 224.

Transaction manager 114 coordinates concurrent execution of the one or more sets of database commands against plurality of databases 140. In particular, transaction manager 114 coordinates concurrent execution of sub-transactions 212, 214, and 216. To provide high availability to HA application 106, it is desirable to provide high availability for plurality of databases 140. In an example, databases 140A, 140B, and 140C in plurality of databases 140 are isolated instantiations relative to each other. Databases that are isolated instantiations relative to each other may refer to databases that do not share memory. Plurality of databases 140 may be non-high availability databases. Accordingly, special hardware may be unnecessary in such an embodiment that creates HA application 106.

An example of unnecessary special hardware is a shared storage such as a storage area network (SAN), which is a conventional way to provide high availability to an application. A SAN is a high performance dedicated network used primarily to provide fast and reliable communication between computers and storage devices in a shared storage networking environment. The SAN also enables a storage device to communicate with another storage device. Software solutions at the database level, however, are complex and expensive. For example, shared storage is typically very expensive.

In an example, transaction manager 114 synchronizes execution of one or more sets of SQL commands to multiple databases. In accordance with the coordinated concurrent execution, execution engine 116 may apply each sub-transaction to its corresponding database, which executes the respective sub-transaction. In an example, two databases concurrently execute their respective sub-transactions when execution of the sub-transactions has some overlap in time. In an example, databases 140A and 140B concurrently execute their respective sub-transactions when a time period in which database 140A executes sub-transaction 212 overlaps with a time period in which database 140B executes sub-transaction 214. In another example, databases 140A and 140B concurrently execute their respective sub-transactions when database 140A starts execution of sub-transaction 212 and stops before completion, database 140B start execution of sub-transaction 214 and stops before completion, and database 140B resumes execution of sub-transaction 212. The set of commands may modify plurality of databases 140 by inserting an entity into each database of plurality of databases 140, modifying an entity in each database of plurality of databases 140, or deleting an entity from each database of plurality of databases 140. The set of commands may also retrieve an entity from a database of plurality of databases 140.

Each execution has its own sub-transaction synchronized with composite transaction 210. Transaction manager 114 may determine whether each applied sub-transaction has successfully completed. When a particular database successfully completes a sub-transaction, the particular database may send to transaction manager 114 a confirmation of successful completion of the sub-transaction. Accordingly, for each successfully completed sub-transaction, transaction manager 114 may receive a confirmation of successful completion of the respective sub-transaction. For example, databases 141A and 140C may have successfully executed their respective sub-transactions and may send to transaction manager 114 messages 232 and 236, respectively. Messages 232 and 236 include an "OK!" message that indicates to transaction manager 114 that the executions of sub-transactions 212 and 216 were successful.

Transaction manager 114 may have a timeout period in which transaction manager 114 accepts a confirmation from a database. In an example, when a confirmation of successful completion of a particular sub-transaction is received before a timeout period has elapsed, transaction manager 114 may determine that the particular sub-transaction has been successfully completed. When the confirmation of successful completion of the particular sub-transaction is not received before the timeout period has elapsed, transaction manager 114 may determine that the particular sub-transaction has not been successfully completed. Each execution may have its own sub-transaction synchronized with composite transaction 210 and defined timeout for the operation.

D. Inform Persistence Layer of Status of Composite Transaction

When each sub-transaction is determined to have successfully completed, transaction manager 114 may send to persistence layer 110 a message indicating successful completion of the composite transaction. Responsive to the message indicating successful completion of the composite transaction, persistence layer 110 may commit the composite transaction. After persistence layer 110 receives the message indicating successful completion of the composite transaction from high-availability layer 112, persistence layer 110 may communicate to HA application 106 that the data was written safely. After the commit of the composite transaction, the transient entity is persisted to the plurality of databases and is a persistent entity in plurality of databases 140. Accordingly, each database of plurality of databases 140 that successfully completes a sub-transaction stores a result of the sub-transaction (e.g., the state of transient entity 108 as persistent entity 120). In this example, the data written into each database of the plurality of databases 140 is the same.

Each database of plurality of databases 140 may contain the same data but are not connected. In such an example, the databases of plurality of databases 140 may be isolated instantiations relative to each other and do not communicate with each other. If persistence layer 110 subsequently receives a request associated with persistent entity 120, persistence layer 110 may generate, based on the request, one or more sets of database commands associated with persistent entity 120. In an example, execution of the one or more generated sets of database commands against plurality of databases 140 cause the retrieval of persistent entity 120 from a database of plurality of databases 140. Further, persistence layer 110 may load balance read-only database operations across all used databases, potentially resulting in increased overall performance of HA application 106.

In another example, execution of the one or more generated sets of database commands against plurality of databases 140 may cause persistent entity 120 to be modified in each database of plurality of databases 140. In another example, execution of the one or more generated sets of database commands against plurality of databases 140 may cause persistent entity 120 to be deleted from each database of plurality of databases 140.

In contrast, when each sub-transaction is determined to have not successfully completed, all of the databases of plurality of databases 140 do not persist the state of transient entity 108. Transaction manager 114 identifies the one or more failed sub-transactions. In the example illustrated in FIG. 2, database 140B does not send to transaction manager 114 a confirmation of successful completion of sub-transaction 214. As such, transaction manager 114 may identify sub-transaction 214 as a failed sub-transaction. For each failed sub-transaction, transaction manager 114 may remove the failed sub-transaction from the composite transaction. Accordingly, the failed sub-transaction has no effect on composite transaction 210, and remaining sub-transactions may continue to execute.

For each failed sub-transaction, transaction manager 114 may remove from plurality of databases 140 a database corresponding to the failed sub-transaction. A database may be considered inactive when it does not return to transaction manager 114 a confirmation of successful completion of the sub-transaction within the timeout period. Any inactive databases are removed from plurality of databases 140. Accordingly, transaction manager 114 may remove database 140B from plurality of databases 140. As such, databases 140A and 140C may store the state of transient entity 108, but database 140B may not store the state of transient entity 108. Persistence layer 110 may continue with the remaining databases still remaining in plurality of databases 140 and log that database 140B is inactive. The outage of database 140B may be unnoticed by HA application 106 and does not influence it.

Even if one or more databases of plurality of databases 140 fails to execute its respective sub-transaction, as long as plurality of databases 140 has at least one database after the removal of the one or more inactive databases, transaction manager 114 sends to persistence layer 110 a message indicating successful completion of the composite transaction. Responsive to the message indicating successful completion of the composite transaction, persistence layer 110 may commit the composite transaction. In a subsequent request to persist an entity, high-availability layer 112 may persist the state of the entity only to databases 140A and 140C, which are the only databases in plurality of databases 140. If, however, plurality of databases 140 has no active databases remaining after the removal of the one or more inactive databases, an exception of persistence layer 110 is generated and composite transaction 210 is marked as rollback only. Accordingly, each of the sub-transactions is rolled back.

III. Java Persistence API

Figure 3:
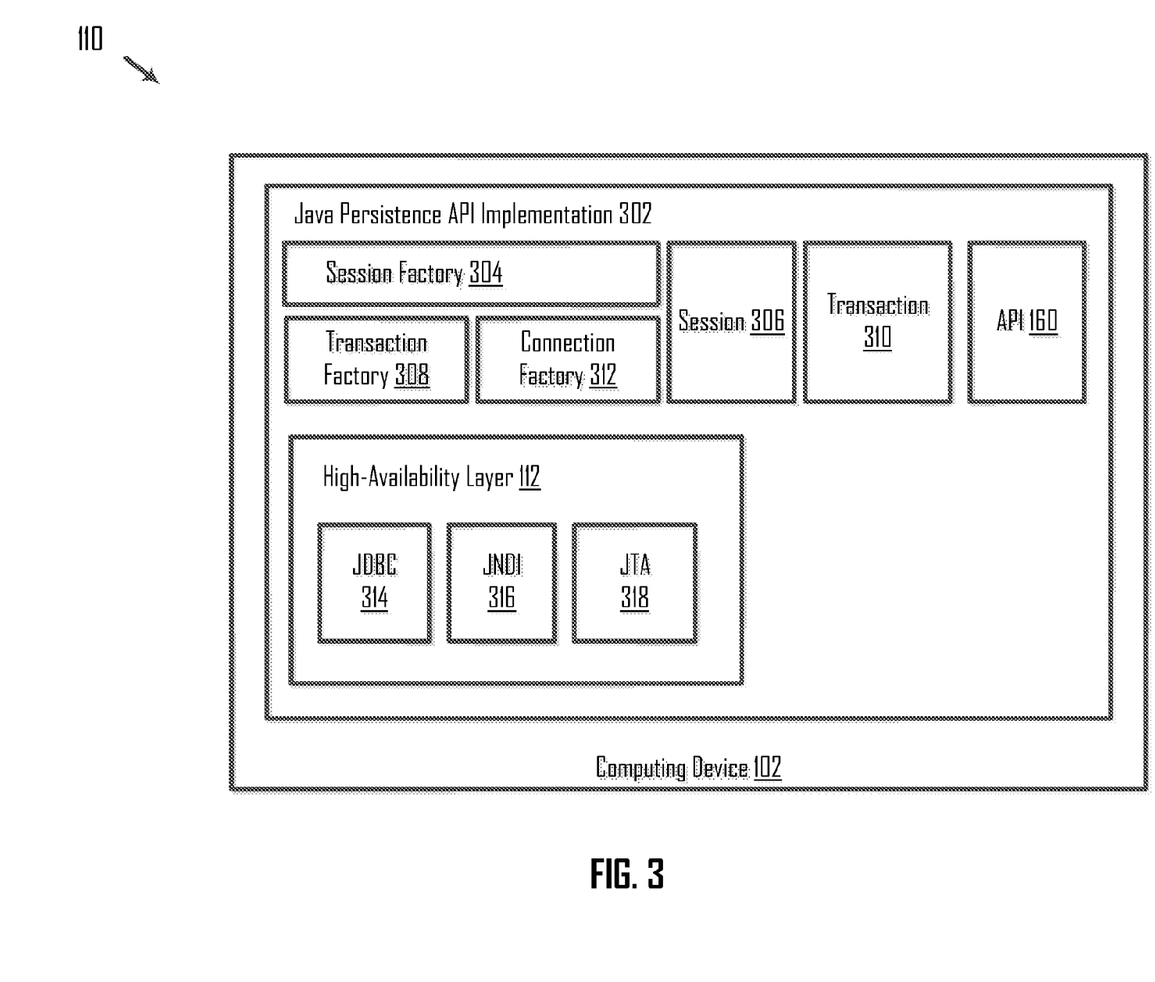
FIG. 3 is a block diagram illustrating a persistence layer that includes a Java Persistence Application Programming Interface (JPA) implementation, according to an embodiment.

In an example, persistence layer 110 includes a Java® Persistence Application Programming Interface (JPA) implementation. FIG. 3 is a block diagram illustrating a persistence layer 110 that includes a JPA implementation 302, according to an embodiment. In an example, Hibernate® is the JPA provider. Trademarks are the property of their respective owners.

JPA implementation 302 includes a session factory 304 and a session 306. Session 306 may be created by instantiating a new session via session factory 304. Session 306 may start when HA application 106 begins executing on computing device 102 and end when HA application 106 is shut down. JPA implementation 302 also includes a transaction factory 308 and a transaction 310. Transaction 310 may be created by instantiating a new session via transaction factory 308. In an example, transaction 310 is a composite transaction (e.g., composite transaction 210). JPA implementation 302 also includes a connection factory 312 to establish a connection to databases of plurality of databases 140.

High-availability layer 112 may implement high availability for JPA at the software level. JPA implementation 302 may be one logical unit, and HA application 106 may have access to internal APIs (e.g., session factory 304, transaction factory 308, connection factory 312) of JPA implementation 302. High-availability layer 112 includes a Java Database Connectivity (JDBC) 314, Java Naming and Directory Interface (JNDI) 316, and Java Transaction API (JTA) 318. JDBC 314 is a standard for communicating with databases and provides a set of programming interfaces to manipulate plurality of databases 140. If a database server returns a JDBC exception (e.g. related to data integrity), all sub-transactions are marked as rollback only. This situation may also cause composite transaction 210 and all other sub-transactions to be marked as rollback only. JNDI 316 provides a standard API to reach objects from and write objects to directories. JNDI 316 may perform data lookups in the databases. JTA 318 defines a set of interfaces for HA application 106 to demarcate transactions' boundaries. JTA 318 may have control over the sub-transactions that are executed against their applicable databases. Additionally, the translation to a proper JDBC relative to a specific database may be performed by JTA 318.

The Java Persistence Query Language (JPQL) enables retrieval of data with an object-oriented query language. For example, JPQL may take a particular language and create one or more sets of SQL commands for concrete and connected databases. Special hardware may be unnecessary in the embodiment illustrated in FIG. 3 to provide high availability to an application 106. Rather, all databases that are certified for the particular JPA provider may be used to provide high availability for HA application 106 with the databases. High-availability layer 112 may work with any database that is supported by the JPA implementation.

JPA is a Java specification for accessing, persisting, and managing data between Java entities/classes and a relational database. JPA is a standard industry approach for Object to Relational Mapping (ORM) in the Java Industry. This disclosure provides techniques in which it is unnecessary to have any special hardware, database configuration, or a special version of a JDBC driver. Rather, embodiments of the disclosure may work with all certified databases for a concrete JPA implementation. JPA may be configured as a persistent storage with a high availability feature database that is certified for a particular JPA provider. There is no need for expensive hardware, special database configurations or re-certification of the configured database with high availability mode.

As discussed above and further emphasized here, FIGS. 1-3 are merely examples, which should not unduly limit the scope of the claims. For example, it should be understood that one or more components may be combined with another component. In an example, transaction manager 114 and execution engine 116 are combined into one component. It should also be understood that a component may be separated into more than one component.

Additionally, high-availability layer 112 may be coupled to persistence layer 110 in a variety of ways. In the example illustrated in FIG. 1, high-availability layer 112 is incorporated into persistence layer 110. In such an example, high-availability layer 112 may be an extension of persistence layer 110 and implemented directly into persistence layer 110. Persistence layer 110 may execute on an application server and provide additional value for it because persistence layer 110 provides high availability for an application out of the box. There is no need for additional software or hardware to achieve high availability at persistence layer 110.

In another example, persistence layer 110 and high-availability layer 112 execute on different computing devices and communicate over a network. In such an example, persistence layer 110 may generate one or more sets of commands and send the one or more generated sets of commands to high-availability layer 112. Additionally, high-availability layer 112 may invoke APIs at persistence layer 110 over a network.

IV. Example Method

Figure 4:
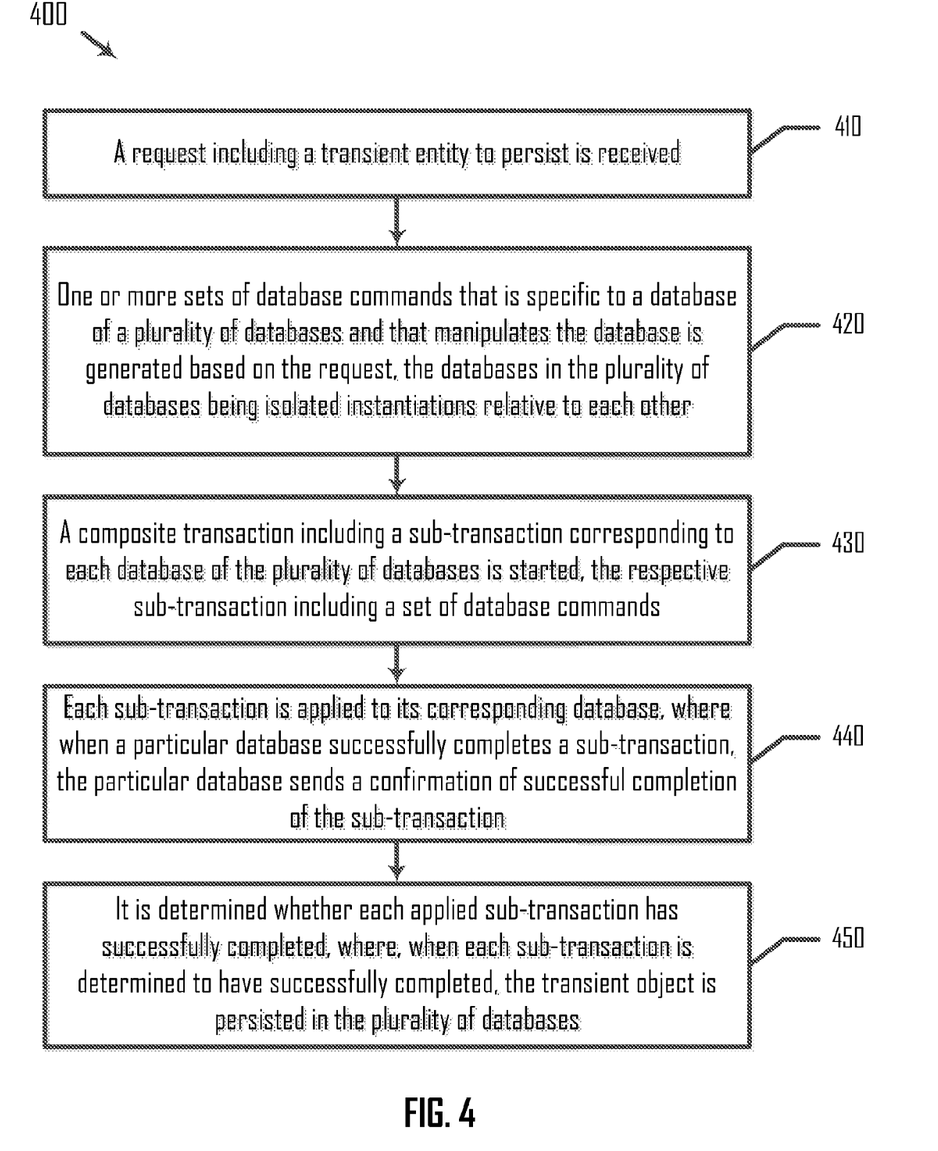
FIG. 4 is a flowchart illustrating a method of providing high availability to an application, according to an embodiment.

FIG. 4 is a flowchart illustrating a method 400 of providing high availability to an application, according to an embodiment. Method 400 is not meant to be limiting and may be used in other applications.

Method 400 includes blocks 410-450. In a block 410, a request including a transient entity to persist is received. In an example, persistence layer 110 receives a request including transient entity 108 to persist. In a block 420, one or more sets of database commands that is specific to a database of a plurality of databases and that manipulates the database is generated based on the request, the databases in the plurality of databases being isolated instantiations relative to each other. In an example, persistence layer 110 generates, based on the request, one or more sets of database commands that is specific to a database of plurality of databases 140 and that manipulates the database, the databases in plurality of databases 140 being isolated instantiations relative to each other.

In a block 430, a composite transaction including a sub-transaction corresponding to each database of the plurality of databases is started, the respective sub-transaction including a set of database commands. In an example, high-availability layer 112 starts a composite transaction including a sub-transaction corresponding to each database of plurality of databases 140, the respective sub-transaction including a set of database commands. In a block 440, each sub-transaction is applied to its corresponding database, where when a particular database successfully completes a sub-transaction, the particular database sends a confirmation of successful completion of the sub-transaction. In an example, execution engine 116 applies each sub-transaction to its corresponding database, where when a particular database successfully completes a sub-transaction, the particular database sends a confirmation of successful completion of the sub-transaction.

In a block 450, it is determined whether each applied sub-transaction has successfully completed, where when each sub-transaction is determined to have successfully completed, the transient object is persisted in the plurality of databases. In an example, transaction manager 114 determines whether each applied sub-transaction has successfully completed, where when each sub-transaction is determined to have successfully completed, transient object 108 is persisted in plurality of databases 140.

It is also understood that additional processes may be inserted before, during, or after blocks 410-450 discussed above. It is also understood that one or more of the blocks of method 400 described herein may be omitted, combined, or performed in a different sequence as desired.

V. Example Computing System

Figure 5:
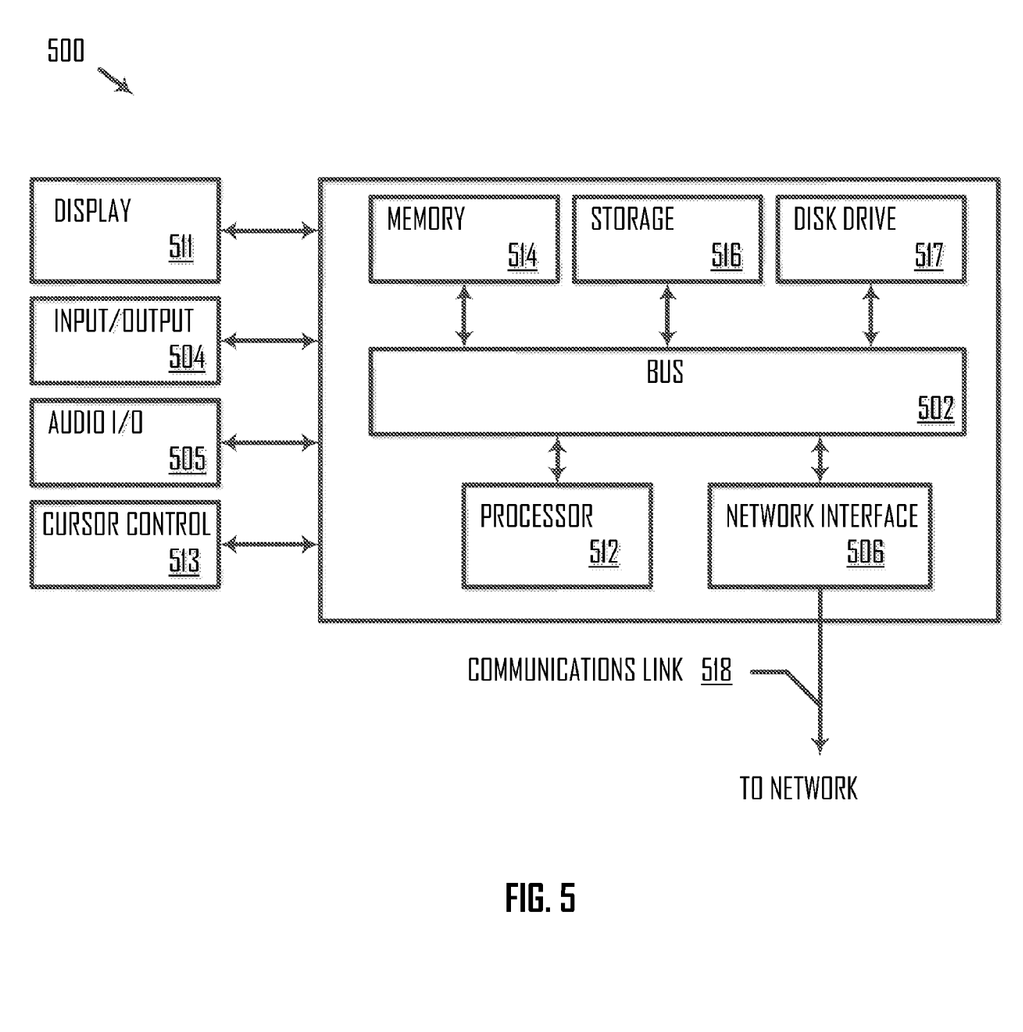
FIG. 5 is a block diagram of an electronic system suitable for implementing one or more embodiments of the present disclosure.

FIG. 5 is a block diagram of a computer system 500 suitable for implementing one or more embodiments of the present disclosure. Each of HA application 106, persistence layer 110, and HA application 106 may execute on a computing device. The computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for providing high availability to an application, comprising:
   a plurality of databases, wherein databases in the plurality of databases are isolated instantiations relative to each other;
   a persistence layer that receives a request including a transient entity to persist and generates, based on the request, one or more sets of database commands that is specific to a database of the plurality of databases and that manipulates the database;

a plurality of application servers that deploy a high-availability application, wherein the high-availability application creates the transient entity and sends the request to the persistence layer; and a high-availability layer that is an intermediary between the persistence layer and the plurality of databases, and includes a transaction manager and an execution engine, wherein the transaction manager, executed by at least one hardware processor, starts a composite transaction including a sub-transaction corresponding to each database of the plurality of databases and determines whether each applied sub-transaction has successfully completed, wherein when each sub-transaction is determined to have successfully completed, the transaction manager sends to the persistence layer a message indicating successful completion of the composite transaction, and wherein a sub-transaction includes a set of database commands; and an execution engine, executed by at least one hardware processor, that applies each sub-transaction to its corresponding database, wherein when a particular database successfully completes a sub-transaction, the particular database sends a confirmation of successful completion of the sub-transaction.

2. The system of claim 1, wherein the high-availability application is written in an object-oriented programming language and the transient entity has a state including one or more behaviors and one or more methods.

3. The system of claim 2, wherein the persistence layer performs an object to relational mapping (ORM) of the state of the transient entity to each of the databases of the plurality of databases.

4. The system of claim 3, wherein the persistence layer includes a JAVA Persistence Application Programming Interface (JPA) implementation that generates the one or more sets of database commands, and the transaction manager invokes an application programing interface (API) of the JPA.

5. The system of claim 1, wherein responsive to the message indicating successful completion of the composite transaction, the persistence layer commits the composite transaction.

6. The system of claim 5, wherein the persistence layer persists the transient entity to the plurality of databases, wherein after the transient entity is persisted to the plurality of databases, the transient entity is a persistent entity.

7. The system of claim 6, wherein the persistence layer receives a second request associated with the persistent entity and generates, based on the request, one or more sets of database commands that manipulates the persistent entity stored in the plurality of databases.

8. The system of claim 1, wherein the transaction manager coordinates concurrent execution of the generated one or more sets of database commands against the plurality of databases.

9. The system of claim 8, wherein the plurality of databases includes a first database and a second database, and wherein a time period in which the first database executes its corresponding sub-transaction overlaps with a time period in which the second database executes its corresponding sub-transaction.

10. The system of claim 1, wherein for each successfully completed sub-transaction, the transaction manager receives a confirmation of successful completion of the respective sub-transaction.

11. The system of claim 10, wherein when a confirmation of successful completion of a particular sub-transaction is received before a timeout period has elapsed, the transaction manager determines that the particular sub-transaction has successfully completed, and when the confirmation of successful completion of the particular sub-transaction is not received before the timeout period has elapsed, the transaction manager determines that the particular sub-transaction has not successfully completed.

12. The system of claim 10, wherein for each failed sub-transaction, the transaction manager removes from the plurality of databases a database corresponding to the failed sub-transaction and removes from the composite transaction the failed sub-transaction.

13. The system of claim 12, wherein each database of the plurality of databases is an active database and each removed database is an inactive database.

14. The system of claim 1, wherein databases of the plurality of databases do not share memory, and databases that successfully complete a sub-transaction store a result of the sub-transaction.

15. A method of providing high availability to an application, comprising:

receiving a request including a transient entity to persist;

generating, based on the request, one or more sets of database commands that is specific to a database of a plurality of databases and that manipulates the database, the databases in the plurality of databases being isolated instantiations relative to each other;

starting a composite transaction including a sub-transaction corresponding to each database of the plurality of databases, the respective sub-transaction including a set of database commands;

applying, executed by at least one hardware processor, each sub-transaction to its corresponding database, wherein when a particular database successfully completes a sub-transaction, the particular database sends a confirmation of successful completion of the sub-transaction;

determining whether each applied sub-transaction has successfully completed, wherein when each sub-transaction is determined to have successfully completed, the transient object is persisted in the plurality of databases; and for each successfully completed sub-transaction, receiving a confirmation of successful completion of the respective sub-transaction, wherein when a confirmation of successful completion of a particular sub-transaction is received before a timeout period has elapsed, the particular sub-transaction is determined to have been successfully completed, and when the confirmation of successful completion of the particular sub-transaction is not received before the timeout period has elapsed, the particular sub-transaction is determined to have not been successfully completed.

16. The method of claim 15, further including:

for each failed sub-transaction:
  removing from the plurality of databases a database corresponding to the failed sub-transaction; and
  removing from the composite transaction the failed sub-transaction.

17. The method of claim 15, further including:

coordinating concurrent execution of the generated one or more sets of database commands against the plurality of databases, wherein the applying is in accordance with the coordinated execution.

18. The method of claim 17, wherein the plurality of databases includes a first database and a second database, and wherein a time period in which the first database executes its corresponding sub-transaction overlaps with a time period in which the second database executes its corresponding sub-transaction.

19. A non-transitory machine-readable medium comprising a plurality of machine-readable instructions that when executed by one or more processors is adapted to cause the one or more processors to perform a method comprising:
  receiving a request including a transient entity to persist;
  generating, based on the request, one or more sets of database commands that is specific to a database of a plurality of databases and that manipulates the database, the databases in the plurality of databases being isolated instantiations relative to each other;
  starting a composite transaction including a sub-transaction corresponding to each database of the plurality of databases, the respective sub-transaction including a set of database commands;
  applying each sub-transaction to its corresponding database, wherein when a particular database successfully completes a sub-transaction, the particular database sends a confirmation of successful completion of the sub-transaction;
  determining whether each applied sub-transaction has successfully completed, wherein when each sub-transaction is determined to have successfully completed, the transient object is persisted in the plurality of databases; and
  for each successfully completed sub-transaction, receiving a confirmation of successful completion of the respective sub-transaction, wherein when a confirmation of successful completion of a particular sub-transaction is received before a timeout period has elapsed, the particular sub-transaction is determined to have been successfully completed, and when the confirmation of successful completion of the particular sub-transaction is not received before the timeout period has elapsed, the particular sub-transaction is determined to have not been successfully completed.

\* \* \* \* \*